United States Patent
Park

(10) Patent No.: US 11,059,958 B2
(45) Date of Patent: Jul. 13, 2021

(54) RUBBER COMPOSITION FOR PROTECTING SIDEWALL OF TIRE FROM OZONE AND TIRE MANUFACTURED USING THE SAME

(71) Applicant: HANKOOK TIRE CO., LTD., Seoul (KR)

(72) Inventor: Han Ki Park, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 0 days.

(21) Appl. No.: 15/594,030

(22) Filed: May 12, 2017

(65) Prior Publication Data

US 2018/0327571 A1    Nov. 15, 2018

(51) Int. Cl.
*C08L 7/00*     (2006.01)
*C08L 9/00*     (2006.01)

(52) U.S. Cl.
CPC .. *C08L 7/00* (2013.01); *C08L 9/00* (2013.01)

(58) Field of Classification Search
None
See application file for complete search history.

(56) References Cited

U.S. PATENT DOCUMENTS

| | | | | |
|---|---|---|---|---|
| 4,244,864 A | * | 1/1981 | Campbell | C07D 215/20 524/87 |
| 2014/0034206 A1 | * | 2/2014 | Mizuno | B60C 1/0025 152/516 |

FOREIGN PATENT DOCUMENTS

| | | | |
|---|---|---|---|
| CN | 101117409 A | | 2/2008 |
| CN | 103642083 A | * | 3/2014 |
| CN | 103865122 A | * | 6/2014 |
| EP | 1741569 A2 | | 1/2007 |
| JP | H01297307 A | | 11/1989 |
| JP | H04121205 A | | 4/1992 |
| JP | 2003175708 A | * | 6/2003 |
| JP | 2005153604 A | | 6/2005 |
| JP | 2007297602 A | | 11/2007 |
| JP | 2011137169 A | | 7/2011 |
| JP | 2013095837 A | | 5/2013 |
| JP | 2013221052 A | * | 10/2013 |
| KR | 2002037589 A | * | 5/2002 |
| KR | 20020037589 A | * | 5/2002 |

(Continued)

OTHER PUBLICATIONS

JP-2003175708-A, Jun. 2003, Machine Translation and partial human transation.*

(Continued)

*Primary Examiner* — Satya B Sastri
(74) *Attorney, Agent, or Firm* — Marshall, Gerstein & Borun LLP

(57) ABSTRACT

Disclosed is a rubber composition for protecting a sidewall of a tire from ozone and a tire manufactured using the same. More specifically, disclosed is a tire including a rubber sheet for preventing aging between a sidewall and a carcass, wherein the rubber sheet for preventing aging includes a rubber composition including 100 parts by weight of a base rubber, 20 to 60 parts by weight of carbon black, and 2 to 5 parts by weight of an amine-based anti-aging agent. The tire produced from the rubber composition has an effect of exhibiting significantly improved ozone resistance without changing a degree of blackness in terms of appearance.

3 Claims, 3 Drawing Sheets

(56) References Cited

FOREIGN PATENT DOCUMENTS

KR        2010053176 A  *  5/2010

OTHER PUBLICATIONS

KR-20020037589-A, May 2002, Machine Translation.*
JP-2013221052-A, Oct. 2013, Machine Translation.*
JP-2013221052-A, Oct. 2013, Machine Translation (Year: 2013).*
CN-103642083-A, Derwent AB.,, Mar. 2014 (Year: 2014).*
CN-103865122-A, Derwent AB., , Jun. 2014 (Year: 2014).*
KR2002037589 A, Derwent Ab., May 2002 (Year: 2002).*
KR2010053176 A , DERWENT Ab., , May 2010 (Year: 2010).*
Extended European Search Report issued in European Patent Application No. 17171778.8 dated Nov. 3, 2017.
Office Action issued in Japanese Patent Application No. 2017-096672 dated Apr. 10, 2018.
Office Action issued in Chinese Patent Application 201710286433.1 dated Feb. 25, 2020.

* cited by examiner

A

RUBBER COMPOSITION FOR PROTECTING SIDEWALL OF TIRE FROM OZONE AND TIRE MANUFACTURED USING THE SAME

TECHNOLOGICAL FIELD

The present disclosure relates to a rubber composition for protecting a sidewall of a tire from ozone and a tire manufactured using the same. More specifically, the present disclosure relates to a rubber composition which can protect a sidewall of a tire from ozone by placing a rubber composition having superior ozone resistance to aging caused by ozone, ultraviolet light or the like in the form of a sheet between the sidewall of the tire and a carcass, and a tire manufactured using the same.

BACKGROUND

The sidewall of tires is an element on which a variety of information about tires is written, which should resist exterior environmental factors such as sunlight, temperature, ozone and oxygen as well as weather conditions, unlike treads contacting the ground.

The sidewalls of tires require weatherability, aging resistance, bending resistance, heat resistance, heat generation resistance and ozone resistance because it frequently bends and stretches upon receiving light from the sun and needs to discharge heat generated by the tire to the outside. For this reason, a variety of additives are used to acquire properties required for sidewalls. Commonly used materials are rubber compositions which are produced by mixing a diene-based rubber with a great amount of amine-based anti-aging agent or wax.

However, these amine-based anti-aging agents are deposited on the surface of rubber over time and disadvantageously discolor the rubber. In order to prevent the discoloration of the appearance, little or no anti-aging agent is added to a rubber ingredient or a great amount of wax is mixed instead of the anti-aging agent.

The rubber composition prepared from a great amount of wax can prevent appearance deterioration caused by the amine-based anti-aging agent to some extent, while maintaining ozone resistance in a static state.

However, such a rubber composition cannot solve deterioration in heat resistance, dynamic-condition ozone resistance and weatherability, which are other physical properties required for sidewall rubbers.

In order to ultimately solve these problems, amine-based anti-aging agent or wax should not be used. However, when an amine-based anti-aging agent or wax is not mixed, essential physical properties, i.e., weatherability, ozone resistance and heat resistance, required for rubber for the sidewall, may be seriously deteriorated.

Therefore, there is a need for establishing an optimal mix ratio of an amine-based anti-aging agent which can minimize discoloration of tire appearance and maximize weatherability, ozone resistance and heat resistance of the sidewall of tires, or developing a novel anti-aging agent capable of minimizing discoloration, or making an effort to modify the structure of the sidewall of tires.

SUMMARY OF THE DISCLOSURE

Therefore, the present disclosure has been made in view of the above problems, and it is an object of the presently described embodiments to provide a tire including a sheet including a rubber composition for protecting the sidewall of the tire from ozone, between the sidewall and a carcass.

In accordance with the contemplated embodiments, the above and other objects can be accomplished by the provision of a tire including a rubber sheet for preventing aging between a sidewall and a carcass, wherein the rubber sheet for preventing aging includes a rubber composition including 100 parts by weight of a base rubber, 20 to 60 parts by weight of carbon black, and 2 to 5 parts by weight of an amine-based anti-aging agent.

The amine-based anti-aging agent may be any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine and a combination thereof.

The sidewall may include 100 parts by weight of the base rubber and not less than 0 parts by weight to less than 2 parts by weight of the amine-based anti-aging agent.

The rubber composition may further include 1 to 3 parts by weight of any one anti-aging agent selected from the group consisting of phenol, quinoline, imidazole and carbamic acid metal salts and waxes, and combinations thereof.

The rubber composition may further include 1 to 3 parts by weight of 2,2,4-trimethyl-1,2-dihydroquinoline.

BRIEF DESCRIPTION OF THE DRAWINGS

The above and other objects, features and other advantages of the contemplated embodiments will be more clearly understood from the following detailed description taken in conjunction with the accompanying drawings, in which.

DETAILED DESCRIPTION

Hereinafter, embodiments will be described in more detail such that a person having ordinary knowledge in the field to which the present disclosure pertains can easily implement the embodiments. However, the embodiments presently described can be implemented in various forms and should not be interpreted as being limited to the embodiments described in the specification.

The terms used in the present specification are used only to describe specific embodiments and are not intended to limit the scope of the claims. Singular expressions may encompass plural expressions unless clearly specified otherwise. In the present application, it should be understood that terms such as "comprises" or "has", are intended to indicate that disclosed features, numbers, steps, operations, components, parts or combinations thereof exist, and the probability of existence or addition of one or more other features, steps, operations, components, parts or combinations thereof is not excluded thereby.

Figure 1:
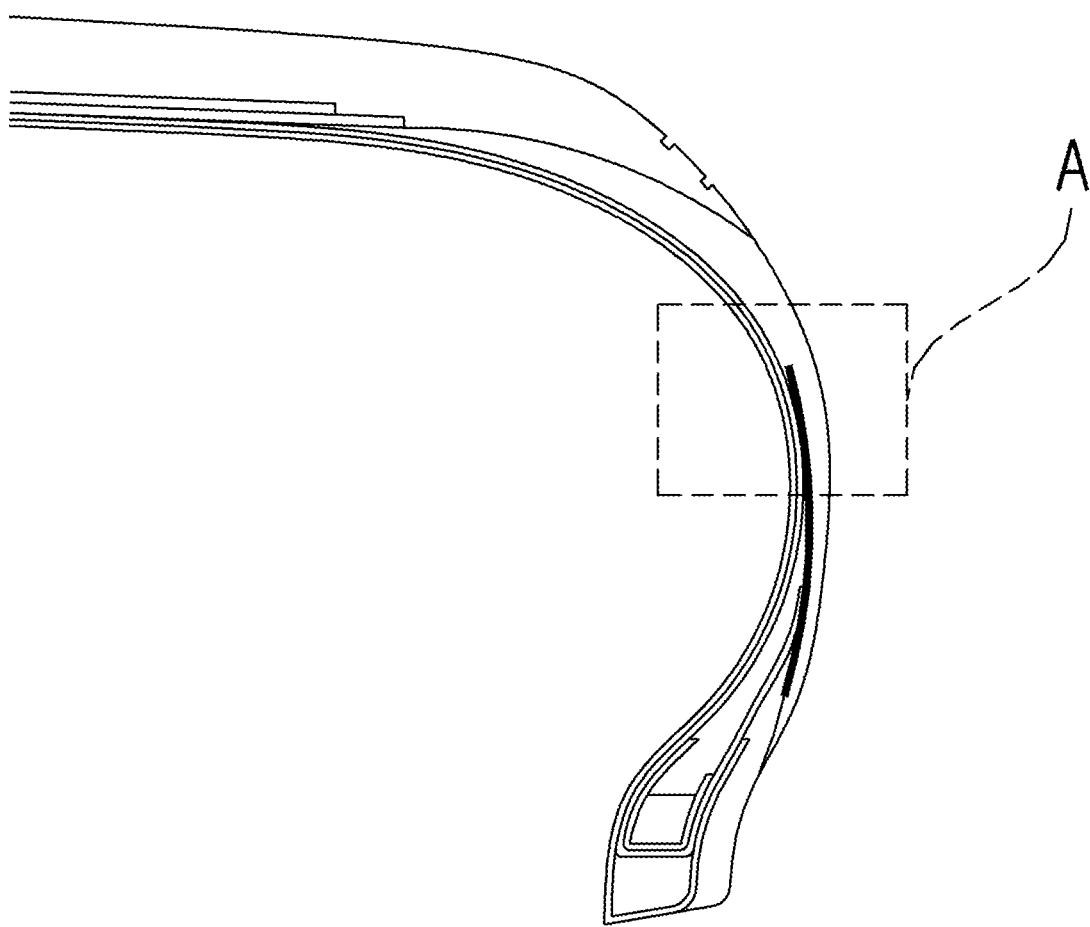
FIG. 1 is a sectional view illustrating the structure of a sidewall of a tire according to an embodiment.
Figure 2:
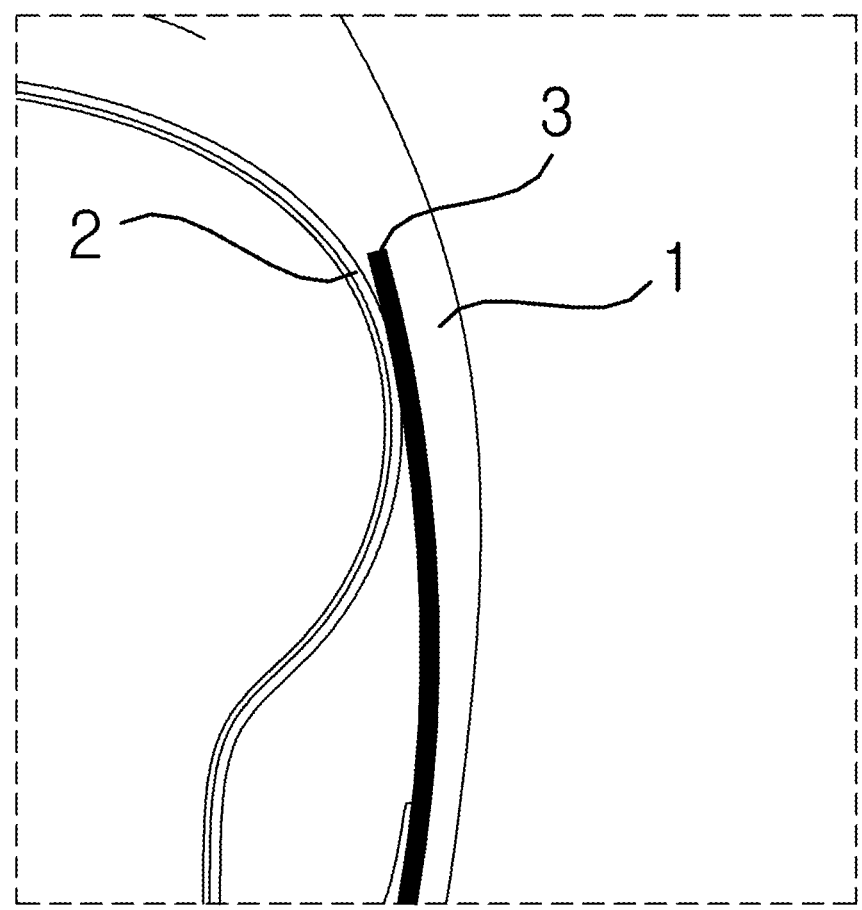
FIG. 2 is an enlarged view illustrating the cross-section of a sidewall according to an embodiment.
Figure 3:
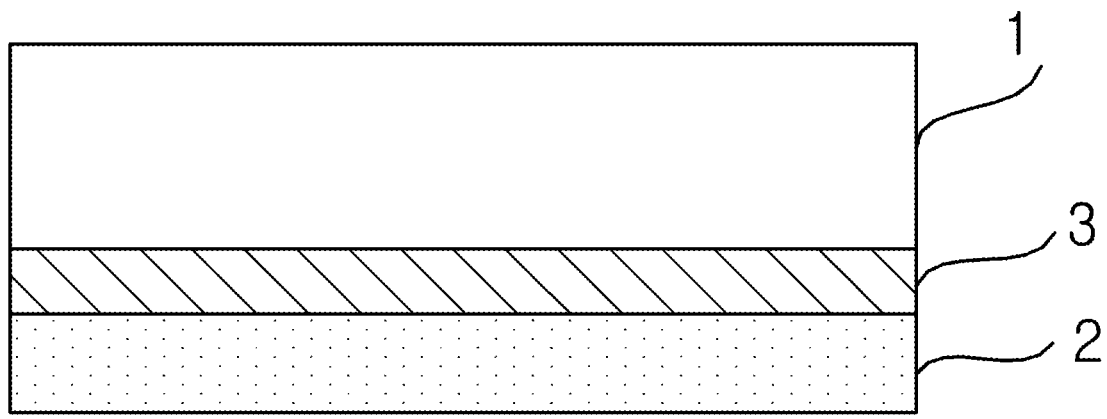
FIG. 3 is a schematic view illustrating the cross-sectional structure of a tire including a rubber composition for protecting the sidewall of tires from ozone disposed between the sidewall and a carcass.

FIG. 1 is a sectional view illustrating the structure of a sidewall of a tire, FIG. 2 is an enlarged view illustrating the sidewall and FIG. 3 is a schematic view illustrating the structure of a sheet including a rubber composition disposed between the sidewall and a carcass.

According to an embodiment, there is provided a tire including a rubber sheet for preventing aging between a sidewall and a carcass, wherein the rubber sheet for preventing aging includes a rubber composition to which an amine-based anti-aging agent is added.

The rubber sheet for preventing aging aims at improving weatherability, ozone resistance and heat resistance of the sidewall by having the amine-based anti-aging agent transferred to the sidewall over time. At the same time, the rubber sheet for preventing aging prevents discoloration of the initial sidewall by minimizing the amount of amine-based anti-aging agent in the sidewall.

Regarding the schematic structure of the sidewall of the tire, as shown in FIGS. 1 and 2, the sidewall includes a sidewall rubber 1 as the outermost element, a carcass 2 supporting the structure of the tire, and a rubber sheet 3 for preventing aging for protecting the sidewall of tires from ozone according to an embodiment, disposed between these two layers.

The rubber sheet for preventing aging 3 according to an embodiment of the present may include a rubber composition consisting of 100 parts by weight of a base rubber, 20 to 60 parts by weight of carbon black and 2 to 5 parts by weight of an amine-based anti-aging agent.

The rubber sheet for preventing aging 3 may be disposed between the sidewall rubber 1 and the carcass 2.

Regarding the rubber sheet 3 for preventing aging, the base rubber may include one or more selected from the group consisting of natural rubber, modified natural rubber and synthetic rubber.

The natural rubber includes cis-1,4-polyisoprene as a main ingredient, but may include trans-1,4-polyisoprene according to desired properties. Accordingly, the natural rubber may include, in addition to natural rubber including cis-1,4-polyisoprene as a main ingredient, natural rubber including trans-1,4-polyisoprene as a major component, for example, balata, which is a latex obtained from trees of the Sapotaceae family indigenous to South America.

The modified natural rubber refers to a rubber produced by modifying or purifying general natural rubber. Examples of the modified natural rubber include epoxidized natural rubber (ENR), deproteinized natural rubber (DPNR), hydrogenated natural rubber and the like.

The synthetic rubber may be selected from the group consisting of styrene butadiene rubber (SBR), modified styrene butadiene rubber, butadiene rubber (BR), modified butadiene rubber, isoprene rubber, neoprene rubber, chlorosulfonated polyethylene rubber, epichlorohydrin rubber, fluorinated rubber, silicone rubber, nitrile rubber, hydrogenated nitrile rubber, nitrile butadiene rubber (NBR), modified nitrile butadiene rubber, chlorinated polyethylene rubber, styrene ethylene butylene styrene (SEBS) rubber, ethylene propylene rubber, ethylene propylene diene (EPDM) rubber, hypalon rubber, chloroprene rubber, ethylene vinyl acetate rubber, acrylic rubber, hydrin rubber, vinylbenzyl chloride styrene butadiene rubber, bromomethyl styrene butyl rubber, maleic acid styrene butadiene rubber, carboxylic acid styrene butadiene rubber, epoxy isoprene rubber, maleic acid ethylene propylene rubber, carboxylic acid nitrile butadiene rubber, brominated polyisobutyl isoprene-co-paramethyl styrene (BIMS) rubber, and combinations thereof, but is not limited thereto.

In particular, the synthetic rubber is preferably butadiene rubber, more preferably high-cis butadiene rubber. The high-cis butadiene rubber may contain 96% by weight or more of cis-1,4 and have a glass transition temperature (Tg) of −104 to −107° C. The high-cis butadiene rubber has an effect of improving low temperature characteristics and elasticity (rebound resilience) within the ranges of the cis-1,4 content and the glass transition temperature.

The base rubber may be a combined rubber which is a combination of a natural rubber or a modified natural rubber and a synthetic rubber so as to improve appearance, prevent breakage and maintain fatigue resistance. In this case, the natural rubber (or modified natural rubber) and synthetic rubber may be mixed in a weight ratio of 1:9 to 9:1. When the natural rubber or modified natural rubber is present in a weight ratio of less than 1, fatigue resistance may be deteriorated and when the synthetic rubber is present in a weight ratio of less than 1, tearing resistance and crack resistance may be deteriorated.

Regarding the rubber sheet 3 for preventing aging, the amine-based anti-aging agent may include any one selected from N-phenyl-N'-(1,3-dimethyl)-p-phenylenediamine (6PPD), N-(1,3-dimethylbutyl)-N'-phenyl-p-phenylenediamine, N-phenyl-N'-isopropyl-p-phenylenediamine (IPPD), N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine and a combination thereof, in an amount of 2 to 5 parts by weight, with respect to 100 parts by weight of the base rubber. More preferably, the amine-based anti-aging agent may be 6PPD or IPPD with excellent heat-aging resistance as well as ozone resistance. When the amine-based anti-aging agent is used in an amount of less than 2 parts by weight, the effect of preventing aging is insufficient and when the amine-based anti-aging agent is used in an amount exceeding 5 parts by weight, the amount of the amine-based anti-aging agent which migrates to the sidewall is increased and thus causes discoloration.

The carbon black present in the rubber sheet 3 for preventing aging is not particularly limited and preferably has a BET (Brunauer, Emmett, Teller) specific surface area of 70 to 100 $m^2/g$, a DBP (n-dibutyl phthalate) absorption value of 100 to 110 g/100 g and an iodine absorption value of 90 to 120 mg/g. When the nitrogen absorption specific surface area, DBP oil absorption and iodine absorption value of carbon black are within the ranges defined above, a rubber composition for tires having suitable reinforcement as well as processability can be produced.

Representative examples of the carbon black include, but are not limited to, N110, N121, N134, N220, N231, N234, N242, N293, N299, 5315, N326, N330, N332, N339, N343, N347, N351, N358, N375, N539, N550, N582, N630, N642, N650, N683, N754, N762, N765, N774, N787, N907, N908, N990 and N991.

The carbon black may be used in an amount of 20 to 60 parts by weight, with respect to 100 parts by weight of the base rubber. When the carbon black is used in an amount of less than 20 parts by weight, tire durability may be deteriorated due to insufficient reinforcement of the rubber sheet, and when the carbon black is used in an amount exceeding 60 parts by weight, low fuel consumption of tires may be deteriorated due to increased hysteresis of rubber sheet.

In addition, the rubber sheet 3 for preventing aging may further include an anti-aging agent, in addition to the amine-based anti-aging agent. The anti-aging agent is an additive used to stop chain reactions in which the tire is automatically oxidized by oxygen, which may be suitably selected from phenol-, quinoline- and imidazole-based carbamic acid metal salts and waxes and combinations thereof.

The phenol-based anti-aging agent may be selected from the group consisting of phenol-based compounds, for example, 2,2'-methylene-bis(4-methyl-6-tert-butylphenol), 2,2'-isobutylidene-bis(4,6-dimethylphenol), 2,6-di-t-butyl-p-cresol and a combination thereof.

The quinoline-based anti-aging agent may be 2,2,4-trimethyl-1,2-dihydroquinoline or a derivative thereof, and specifically may be any one selected from the group consisting of 6-ethoxy-2,2,4-trimethyl-1,2-dihydroquinoline, 6-anilino-2,2,4-trimethyl-1,2-dihydroquinoline, 6-dodecyl-2,2,4-trimethyl-1,2-dihydroquinoline and a combination thereof.

The wax is preferably waxy hydrocarbon.

The anti-aging agent, excluding the amine-based anti-aging agent, should have high solubility to rubber, low volatility and inactivity to rubber, in addition to anti-aging, and should not suppress vulcanization. Taking into consideration these conditions, the anti-aging agent may be present in an amount of 1 to 3 parts by weight, with respect to 100 parts by weight of the base rubber.

More preferably, the rubber sheet 3 for preventing aging may further include 1 to 3 parts by weight of 2,2,4-trimethyl-1,2-dihydroquinoline (RD), with respect to 100 parts by weight of the base rubber. RD has poorer ozone resistance, but is cheaper and has better physical properties such as heat-aging resistance and fatigue resistance than 6PPD or IPPD. When the content of RD increases, it can facilitate migration of the amine-based anti-aging agent to the sidewall rubber and thus improve ozone resistance.

When the RD is present in an amount of less than 1 part by weight, migration of the amine-based anti-aging agent in the rubber sheet for preventing aging is restricted and the amine-based anti-aging agent cannot exert the function of preventing aging in the sidewall, and when the RD is present in an amount exceeding 5 parts by weight, migration of the amine-based anti-aging agent is excessively facilitated and the amine-based anti-aging agent may thus cause discoloration of the sidewall. In addition, using excess RD can cause deterioration in adhesion between the rubber sheet for preventing aging and the sidewall rubber or carcass rubber and thus deterioration in tire durability.

The rubber sheet for preventing aging 3 including the amine-based anti-aging agent can include a predetermined amount, including a mix ratio used for common tire rubber compositions, of any one selected from a variety of additives used in the field to which the present disclosure pertains, such as a reinforcing agent, an activator, a process oil, a vulcanizing agent and a vulcanization accelerator, used for ordinary rubber compositions for tires.

The vulcanizing agent is preferably a sulfur-based vulcanizing agent. The sulfur-based vulcanizing agent may be an inorganic vulcanizing agent such as powdered sulfur, insoluble sulfur, precipitated sulfur, colloidal sulfur, elemental sulfur and polymeric sulfur, and a vulcanization agent producing sulfur, for example, an organic vulcanizing agent such as amine disulfide, tetramethylthiuram disulfide (TMTD), tetraethylthiuram disulfide (TETD), and dithiodimorpholine.

The vulcanizing agent is preferably present in an amount of 1.5 to 2.5 parts by weight with respect to 100 parts by weight of the base rubber because the base rubber is less sensitive to heat and chemically stable owing to suitable vulcanization effects.

The vulcanization accelerator refers to an accelerator which increases a vulcanization rate or promotes a delay action in an initial vulcanization stage.

The vulcanization accelerator may be any one selected from the group consisting of sulfenamide-based, thiazole-based, thiuram-based, thiourea-based, guanidine-based, dithiocarbamic acid-based, aldehyde-amine-based, aldehyde-ammonia-based, imidazoline-based and xanthate-based vulcanization accelerators and combinations thereof.

The sulfenamide vulcanization accelerator may be for example a sulfenamide compound selected from the group consisting of N-cyclohexyl-2-benzothiazylsulfenamide (CBS), N-tert-butyl-2-benzothiazylsulfenamide (TBBS), N,N-dicyclohexyl-2-benzothiazylsulfenamide, N-oxydiethylene-2-benzothiazylsulfenamide, N,N-diisopropyl-2-benzothiazolsulfenamide and combinations thereof.

The thiazol-based vulcanization accelerator may be, for example, any one thiazol-based compound selected from the group consisting of sodium salts of 2-mercaptobenzothiazol (MBT), dibenzothiazyl disulfide (MBTS) and 2-mercaptobenzothiazol, amine salts of 2-mercaptobenzothiazol, copper salts of 2-mercaptobenzothiazol, cyclohexylamine salts of 2-mercaptobenzothiazol, 2-(2,4-dinitrophenyl)mercaptobenzothiazol, 2-(2,6-diethyl-4-morpholinothio)benzothiazol and combinations thereof.

The thiuram-based vulcanization accelerator may be, for example, a thiuram-based compound selected from the group consisting of tetramethylthiuram disulfide (TMTD), tetraethylthiuram disulfide, tetramethylthiuram monosulfide, dipentamethylene thiuram disulfide, dipentamethylene thiuram monosulfide, dipentamethylene thiuram tetrasulfide, dipentamethylene thiuram hexasulfide, tetrabutylthiuram disulfide, pentamethylene thiuram tetrasulfide and combinations thereof.

The thiourea-based vulcanization accelerator is, for example, any one thiourea-based compound selected from the group consisting of thiocarbamide, diethylthiourea, dibutylthiourea, trimethylthiourea, diortho-tolylthiourea and combinations thereof.

The guanidine-based vulcanization accelerator is, for example, any one guanidine-based compound selected from the group consisting of diphenylguanidine, diortho-tolylguanidine, triphenylguanidine, ortho-tolylbiguanidine, diphenylguanidine phthalate and combinations thereof.

The dithiocarbamic acid-based vulcanization accelerator is, for example, any one dithiocarbamic acid-based compound selected from the group consisting of zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyldithiocarbamate, zinc dipropyl dithiocarbamate, zinc complex salts of pentamethylene dithiocarbamate and piperidine, zinc hexadecyl isopropyl dithiocarbamate, zinc octadecyl isopropyl dithiocarbamate, zinc dibenzyl dithiocarbamate, sodium diethyl dithiocarbamate, piperidine pentamethylene dithiocarbamate, selenium dimethyl dithiocarbamate, tellurium diethyl dithiocarbamate, cadmium diamyl dithiocarbamate and combinations thereof.

The aldehyde-amine-based or aldehyde-ammonia-based vulcanization accelerator is, for example, an aldehyde-amine-based or aldehyde-ammonia-based compound selected from the group consisting of an acetaldehyde-aniline reaction product, a butyraldehyde-aniline condensate, hexamethylenetetramine, an acetaldehyde-ammonia reaction product and a combination thereof.

The imidazoline-based vulcanization accelerator is, for example, an imidazoline-based compound such as 2-mercaptoimidazoline, and the xanthate-based vulcanization accelerator is, for example, a xanthate-based compound such as zinc dibutyl xanthate.

The vulcanization accelerator may be present in an amount of 0.6 to 1.2 parts by weight, with respect to 100 parts by weight of the base rubber, to maximize production efficiency as well as improvement of physical properties of rubber through increase in vulcanization rate.

The vulcanization accelerator aid is an additive used in combination with the vulcanization accelerator in order to complete facilitation effects of the vulcanization accelerator, which may be any one selected from the group consisting of an inorganic vulcanization accelerator, an organic vulcanization accelerator and a combination thereof.

The inorganic vulcanization accelerator aid may be any one selected from the group consisting of zinc oxide (ZnO), zinc carbonate, magnesium oxide (MgO), lead oxide, potassium hydroxide and combinations thereof. The organic vulcanization accelerator aid may be any one selected from the group consisting of stearic acid, zinc stearate, palmitic acid, linoleic acid, oleic acid, lauric acid, dibutyl ammonium oleate, derivatives thereof and combinations thereof.

In particular, the vulcanization accelerator aid may be a combination of zinc oxide and stearic acid. In this case, zinc oxide is dissolved in stearic acid to produce an effective complex with the vulcanization accelerator, which creates sulfur advantageous during vulcanization and thereby facilitates cross-linkage of rubber.

In a case in which zinc oxide and stearic acid are used in combination, in order for them to serve as a suitable vulcanization accelerator aid, each thereof may be used in an amount of 2.0 to 4.0 parts by weight, with respect to 100 parts by weight of the base rubber. When contents of the zinc oxide and the stearic acid are less than the ranges, production efficiency may be deteriorated due to low vulcanization rate and, when the contents exceed the ranges, scorching occurs, which may deteriorate physical properties.

The softening agent is added to the rubber composition in order to impart plasticity to rubber and thereby facilitate processing or reduce hardness of the vulcanization rubber, which refers to other oil-based materials used for blending or producing rubber. The softening agent means an oil which is contained in a process oil or other rubber composition. The softening agent may be any one selected from the group consisting of petroleum oil, vegetable oil and combinations thereof, but the contemplated embodiments are not limited thereto.

The petroleum oil may be any one selected from the group consisting of paraffin oil, naphthene oil, an aromatic oil and a combination thereof.

Representative examples of the paraffin-based oil include P-1, P-2, P-3, P-4, P-5, P-6 and the like, produced by Michang Oil Ind. Co., Ltd., representative examples of the naphthene-based oil include N-1, N-2, N-3 and the like, produced by Michang Oil Ind. Co., Ltd., and representative examples of the aromatic oil include A-2, A-3 and the like, produced by Michang Oil Ind. Co., Ltd.

However, recently, with increasing interest in the environment, it is reported that, when 3% by weight or more of a polycyclic aromatic hydrocarbon (hereinafter, referred to as "PAH") is present in the aromatic oil, a possibility of inducing cancer is high. Therefore, preferred is treated distillate aromatic extract (TDAE) oil, mild extraction solvate (MES) oil, residual aromatic extract (RAE) oil or medium naphthenic oil.

In particular, the oil used as the softening agent is preferably TDAE oil which contains 3% by weight or less in total of PAHs with respect to the total weight of oil, has a kinematic viscosity of 95 or more (210° F. SUS), and contains to 25% by weight of the aromatic ingredient in the softening agent, 27 to 37% by weight of the naphthene-based ingredient and 38 to 58% by weight of the paraffin-based ingredient.

The TDAE oil imparts superior low-temperature characteristics, excellent fuel efficiency and benefits associated with environmental factors such as cancer-inducing possibility of PAHs to the sidewall of a tire including the same.

The vegetable oil may be any one selected from the group consisting of castor oil, cottonseed oil, linseed oil, canola oil, soybean oil, palm oil, coconut oil, peanut oil, pine oil, pine tar, tall oil, corn oil, rice bran oil, safflower oil, sesame oil, olive oil, sunflower oil, palm kernel oil, *camellia* oil, jojoba oil, macadamia nut oil, safflower oil and a combination thereof.

The softening agent is preferably used in an amount of 2.0 to 6.0 parts by weight with respect to 100 parts by weight of the base rubber in that processability of the base rubber can be improved.

The sidewall rubber composition 1 can prevent discoloration of the sidewall by using no amine-based anti-aging agent or a small amount, that is, less than 1 part by weight of the amine-based anti-aging agent. In addition, crack, which may be caused by ozone or aging during use of the rubber sheet, can be prevented by using the rubber sheet 3 for preventing aging including 2 to 5 parts by weight of the amine-based anti-aging agent.

The rubber sheet 3 for preventing aging and the sidewall rubber composition 1 can be produced by an ordinary two-step continuous process. That is, the rubber sheet 3 and the sidewall rubber composition 1 can be produced in a suitable mixer through a first step (non-production step) of thermo-mechanical treatment or kneading at a maximum temperature of 110 to 190° C., preferably, a high temperature of 130 to 180° C. and a second step (production step) of mechanical treatment, typically at a temperature of less than 110° C., for example, at a low temperature of 40 to 100° C. during finishing involving mixing a cross-linkage system, but the contemplated embodiments are not limited thereto.

The rubber sheet for preventing aging and the sidewall rubber composition may be included in a variety of rubber-organized elements, without being limited to the sidewall. Examples of the rubber-organized elements include treads, apexes, chafers, wire coatings, inner liners or the like.

The tire according to another embodiment can be provided by arranging the aforementioned rubber sheet 3 for preventing aging 3 in the form of a sheet between the sidewall 1 and a carcass 2. Any method may be used as the method of manufacturing a tire including the rubber sheet for preventing aging without limitation so long as it is used for producing conventional tires. Here, a detailed explanation thereof will be omitted.

The tire according to another embodiment may be an automobile tire, a racing tire, an airplane tire, an agricultural machine tire, an off-the road tire, a truck tire, a bus tire or the like. In addition, the tire may be a radial tire or a bias tire, more preferably, a radial tire.

Hereinafter, examples will be provided for better understanding of the contemplated embodiments. However, these examples are given only for illustration and should not be construed as being limited to the embodiments described herein.

Preparation Example: Preparation of Rubber Composition

The rubber compositions of Preparation Examples 1 to 3 were prepared in accordance with the composition shown in the following Table 1. The rubber composition of Preparation Example 1 is a rubber composition for sidewalls, and the rubber compositions of Preparation Examples 2 and 3 are rubber compositions for protecting the sidewall from ozone. Preparation of the rubber composition follows a common method of manufacturing the rubber composition and is not particularly limited.

TABLE 1

|  | Preparation Example 1 | Preparation Example 2 | Preparation Example 3 |
|---|---|---|---|
| Natural rubber[1] | 50 | 50 | 50 |
| Butadiene rubber[2] | 50 | 50 | 50 |
| Carbon black[3] | 50 | 50 | 50 |
| 6PPD[4] | — | 3 | 3 |
| RD[5] | 1 | 1 | 2 |
| Wax[6] | 1 | 1 | 1 |
| Process oil[7] | 5 | 5 | 5 |
| Zinc oxide | 3 | 3 | 3 |
| Stearic acid | 1 | 1 | 1 |
| Sulfur | 1.8 | 1.8 | 1.8 |
| Vulcanization accelerator[8] | 0.7 | 0.7 | 0.7 |

(Unit: parts by weight)
[1] Natural rubber: TSR20 Grade
[2] Butadiene rubber (BR): butadiene rubber having Tg (glass transition temperature) of −106° C. (BR1208 produced by LG Chem, Ltd.)
[3] Carbon black: N330
[4] 6PPD: N-phenyl-N'-(1,3-dimethyl)-p-phenylenediamine (Kumanox-13 produced by Kumho Petrochemical Co., Ltd.)
[5] RD: 2,2,4-trimethyl-1,2-dihydroquinoline (Vulkanox HS/LG produced by Lanxess)
[6] Wax: Paraffin-based wax
[7] Process oil: TDAE (treated distillate aromatic extract) oil softening agent
[8] Vulcanization accelerator: TBBS (N-tert-butyl-2-benzothiazyl sulfenamide)

Comparative Example

A tire was manufactured by producing the sidewall using the rubber composition prepared in Preparation Example 1, and the carcass using a rubber composition commonly used for carcasses.

Example 1

A tire was manufactured by placing the rubber composition for protecting the sidewall of tires from ozone prepared in Preparation Example 2 in the form of a sheet between the carcass and the sidewall including the rubber composition prepared in Preparation Example 1.

Example 2

A tire was manufactured by placing the rubber composition for protecting the sidewall of tires from ozone prepared in Preparation Example 3 in the form of a sheet between the carcass and the sidewall including the rubber composition prepared in Preparation Example 1.

Test Example: Evaluation of Ozone Resistance of Tire Side Part

After aging side parts respectively cut from tires according to Comparative Examples and Examples at an ozone concentration of 50 pphm and at a temperature of 40° C., ozone cracking was observed. Results are shown as numbers in the following Table 2 and compared with one another.

TABLE 2

|  | Comparative Example | Example 1 | Example 2 |
|---|---|---|---|
| Static ozone resistance | C4 | B1 | A1 |
| Appearance | Grade 1 | Grade 1 | Grade 1 |

Number of cracks: A < B < C
Crack size: 1 < 2 < 3 < 4 < 5
Assessment of Degree of blackness:
Grade 1-almost no change in degree of blackness
Grade 2-slight deterioration in degree of blackness
Grade 3-remarkable deterioration in degree of blackness As can be seen from results shown in Table 2, Examples 1 and 2 utilizing the rubber sheet for preventing aging containing the amine-based anti-aging agent exhibit significantly improved ozone resistance, as compared to Comparative Example including only the rubber composition for sidewalls, without utilizing the sheet, and exhibit similar degree of discoloration caused by the amine-based anti-aging agent, to Comparative Example not including the amine-based anti-aging agent.

In addition, as can be seen from Example 2, when the content of RD in the rubber sheet for preventing aging increases, static ozone resistance is improved due to increased migration of the amine-based anti-aging agent to the sidewall rubber.

Based on these results, by arranging the rubber sheet for preventing aging between the sidewall and the carcass, the content of the amine-based anti-aging agent causing discoloration of the rubber composition of the sidewall can be reduced down to less than 2 parts by weight, more preferably, 1 part by weight or less.

As apparent from the foregoing, tires produced from the rubber composition for protecting sidewalls of tires from ozone have effects of exhibiting significantly improved ozone resistance while not changing the degree of blackness, in terms of appearance.

Although the preferred embodiments have been disclosed for illustrative purposes, those skilled in the art will appreciate that various modifications, additions and substitutions are possible, without departing from the scope and spirit of the accompanying claims.

What is claimed is:

1. A tire comprising a sidewall, a carcass, and a rubber sheet for preventing aging of the sidewall, the rubber sheet being disposed between the sidewall and the carcass,
    wherein the rubber sheet comprises a rubber composition comprising 100 parts by weight of a base rubber, 20 parts by weight to 60 parts by weight of carbon black, 2 parts by weight to 5 parts by weight of an amine-based anti-aging agent, and 1 part by weight to 3 parts by weight of a quinoline-based anti-aging agent, and
    wherein the sidewall does not comprise an amine-based anti-aging and comprises 1 part by weight of a quinoline-based anti-aging agent, based on 100 parts by weight of a base rubber,
    wherein the base rubber of the sidewall consists of natural rubber and butadiene rubber, and
    the base rubber of the rubber sheet consists of natural rubber and butadiene rubber.

2. The tire according to claim 1, wherein the amine-based anti-aging agent is any one selected from the group consisting of N-phenyl-N'-(1,3-dimethyl)-p-phenylenediamine, N-(1,3-dimethylbutyl)-N'-phenyl-p-phenylenediamine, N-phenyl-N'-isopropyl-p-phenylenediamine, N,N'-diphenyl-p-phenylenediamine, N,N'-diaryl-p-phenylenediamine, N-phenyl-N'-cyclohexyl-p-phenylenediamine, N-phenyl-N'-octyl-p-phenylenediamine, and a combination thereof.

3. The tire according to claim 1, wherein the quinoline-based anti-aging agent is 2,2,4-trimethyl-1,2-dihydroquinoline.

\* \* \* \* \*